United States Patent
Nelson et al.

(10) Patent No.: US 10,478,763 B2
(45) Date of Patent: Nov. 19, 2019

(54) WATER FILTER

(71) Applicant: US Water Filters, Inc., Bloomington, MN (US)

(72) Inventors: Mark David Nelson, Minnetonka, MN (US); Jamin Arvig, Zumbrota, MN (US)

(73) Assignee: US Water Filters, Inc., Bloomington, MN (US)

( * ) Notice: Subject to any disclaimer, the term of this patent is extended or adjusted under 35 U.S.C. 154(b) by 227 days.

(21) Appl. No.: 15/463,438

(22) Filed: Mar. 20, 2017

(65) Prior Publication Data

US 2017/0304752 A1    Oct. 26, 2017

Related U.S. Application Data

(60) Provisional application No. 62/320,035, filed on Apr. 8, 2016.

(51) Int. Cl.
*B01D 35/143* (2006.01)
*C02F 1/28* (2006.01)
*C02F 1/68* (2006.01)
*C02F 1/00* (2006.01)

(52) U.S. Cl.
CPC .......... *B01D 35/1435* (2013.01); *C02F 1/283* (2013.01); *C02F 1/68* (2013.01); *B01D 2201/56* (2013.01); *C02F 1/003* (2013.01); *C02F 2201/006* (2013.01); *C02F 2209/008* (2013.01); *C02F 2209/445* (2013.01)

(58) Field of Classification Search
CPC .............. B01D 35/1435; B01D 35/143; B01D 2201/56; C02F 1/283; C02F 1/68; C02F 1/003; C02F 1/28; C02F 2201/006; C02F 2201/56; C02F 2209/008; C02F 2209/445
USPC .......................................................... 210/85
See application file for complete search history.

(56) References Cited

U.S. PATENT DOCUMENTS

2012/0138525 A1*  6/2012  Jo ........................... C02F 1/001
                                                              210/446

* cited by examiner

*Primary Examiner* — Jason M Greene
*Assistant Examiner* — Akash K Varma
(74) *Attorney, Agent, or Firm* — Vidas Arrett & Steinkraus P.A.

(57) ABSTRACT

A water filter having a housing having a water inlet and a water outlet on a first end, and a pair of replaceable carbon elements contained within the housing, each carbon element having a water inlet near an outside diameter and a water outlet near the center, both the water outlet and water inlet being on a first end of each carbon element and each of the carbon element inlets being in fluid communication with the housing water inlet and each of the carbon element outlets being in fluid communication with the housing water outlet.

11 Claims, 12 Drawing Sheets

WATER FILTER

CROSS-REFERENCE TO RELATED APPLICATIONS

This application claims priority to provisional patent application No. 62/320,035 filed Apr. 8, 2016, the entire contents of which are hereby incorporated by reference.

STATEMENT REGARDING FEDERALLY SPONSORED RESEARCH

Not Applicable

FIELD OF THE INVENTION

This invention relates to the field of water filters, namely a water filter with replaceable carbon elements.

BACKGROUND OF THE INVENTION

Water filters using carbon as a filter medium are well known in the art. However the carbon medium still gets plugged near the outer edge over time.

What is needed is a water filter which improves the plugging which exists with current carbon filter medium.

A brief abstract of the technical disclosure in the specification is provided as well only for the purposes of complying with 37 C.F.R. 1.72. The abstract is not intended to be used for interpreting the scope of the claims.

BRIEF SUMMARY OF THE INVENTION

Applicants have improved the plugging problem by increasing the surface area to volume ratio, by providing two four inch carbon elements, rather than one larger element. Applicant's have also made their carbon elements replaceable, which cuts down on waste and cost by reusing the water filter housing. The extended life of the water filter housing and the additional space also allow for adding features such as a timer and indicator to signal when the carbon elements need to be replaced. In addition, additives can be added to the water as it flows through the filter, or the volume of the water can be measured rather than elapsed time.

Applicant's have invented an a water filter having a housing having a water inlet and a water outlet on a first end, and a pair of replaceable carbon elements contained within the housing, each carbon element having a water inlet near an outside diameter and a water outlet near the center, both the water outlet and water inlet being on a first end of each carbon element and each of the carbon element inlets being in fluid communication with the housing water inlet and each of the carbon element outlets being in fluid communication with the housing water outlet.

The larger surface area to volume ratio perform filter performance by decreasing the plugging. The carbon elements can be any desired number, but two is preferable. The carbon elements are also replaceable, to allow reuse of the water filter housing. One embodiment provides a tray for holding the carbon elements, which can slide out of the bottom of the water filter to allow ease of access for replacing the carbon elements.

Because the water filter housing can be reused, the extended life makes it economical to add features to the housing such as providing additives to the water as it passes through the filter. For example, additives such as vitamins, flavors, nutraceuticals and electrolytes, or any combination thereof can be added to the water.

A replacement time and indicator can also be added to the base of the water filter housing. The time can measure any predetermined elapsed time, such as three months or six months and indicate when it is time to replace the carbon elements. The indicator can be an LED light which can be arranged to shine light on the floor, or blink or merely illuminate when it is time to replace the carbon elements. Alternatively Bluetooth or WIFI transmitters can be incorporated to allow for transmitting a signal with a paired cellphone or any commercially available reorder technology, such as the Amazon Echo. The electronics would be powered by a lithium watch battery and Bluetooth, WIFI and LED lights are well known in the art. A reset button could also be provided to allow resetting the timer.

Rather than measure elapsed time, the system could measure water volume passing through the filter and indicate replacement after a predetermined volume of water has passed through the filter.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE DRAWINGS

A detailed description of the invention is hereafter described with specific reference being made to the drawings.

DETAILED DESCRIPTION OF THE INVENTION

Figure 1:
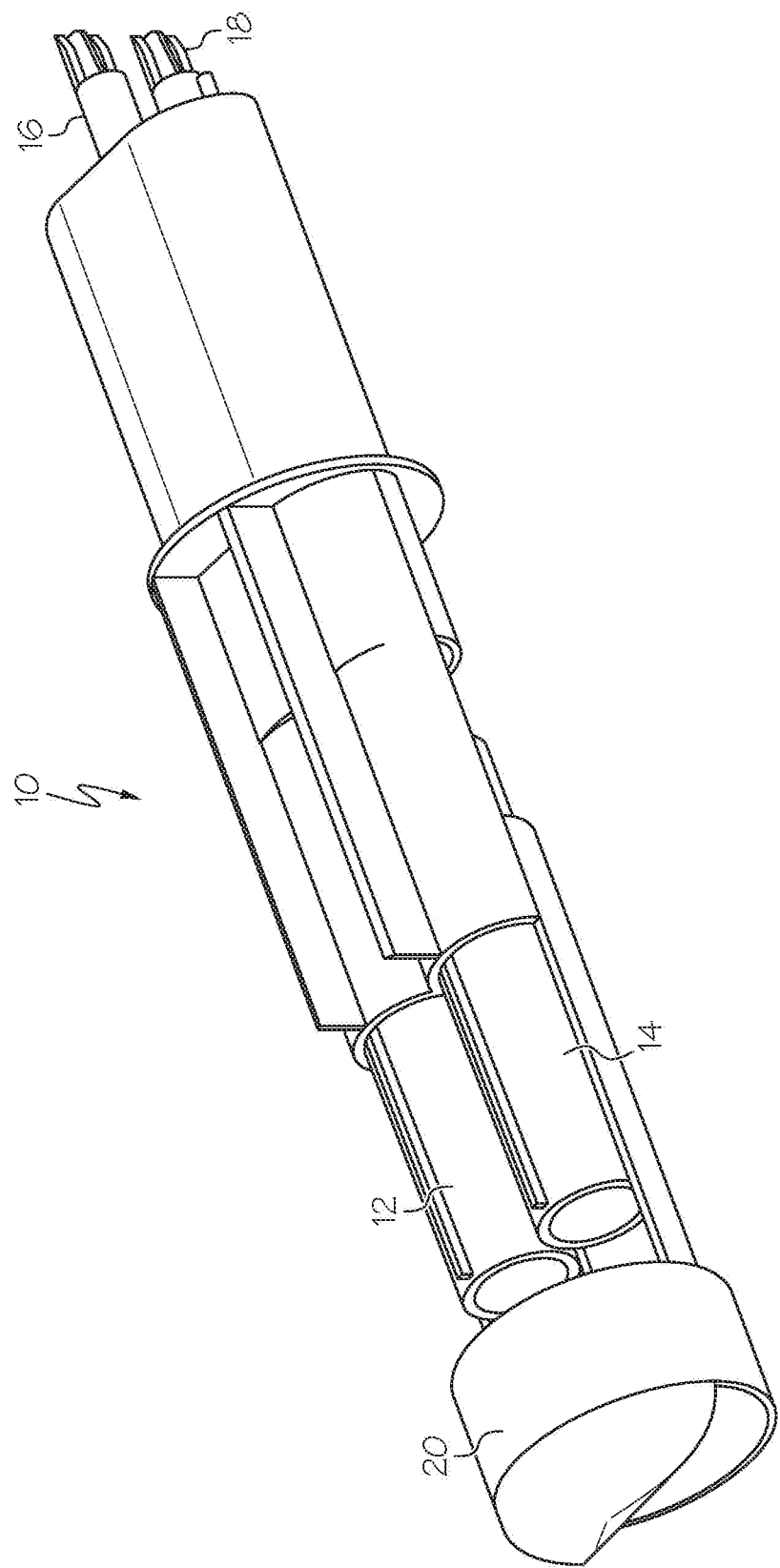
FIG. 1 is a perspective view from the front, bottom and right side of the inventive water filter.

While this invention may be embodied in many forms, there are described in detail herein specific embodiments of the invention. This description is an exemplification of the principles of the invention and is not intended to limit the invention to the particular embodiments illustrated.

For the purposes of this disclosure, like reference numerals in the Figures shall refer to like features unless otherwise indicated.

Referring now to FIG. 1, an embodiment of an inventive water filter is shown generally at 10 in a perspective view showing the bottom, right and front sides of the water filter. The parts of the water filter are shown slid apart and it should be understood that the carbon elements 12 and 14 are each about 4 inches long and the entire water filter, when slid together is about 8 inches long. One end of the water filter 10 has an inlet 16 and an outlet 18. The inlet water is split and runs into each carbon element near its outer diameter and the water flows down the inside of the casing holding the carbon, and back up through the center and out of the carbon element, to be recombined and flow out the outlet 18 (see FIG. 11). The end cap and tray section 20 can slide out so permit the replaceable carbon elements to be removed and replaced with fresh carbon elements.

Figure 2:
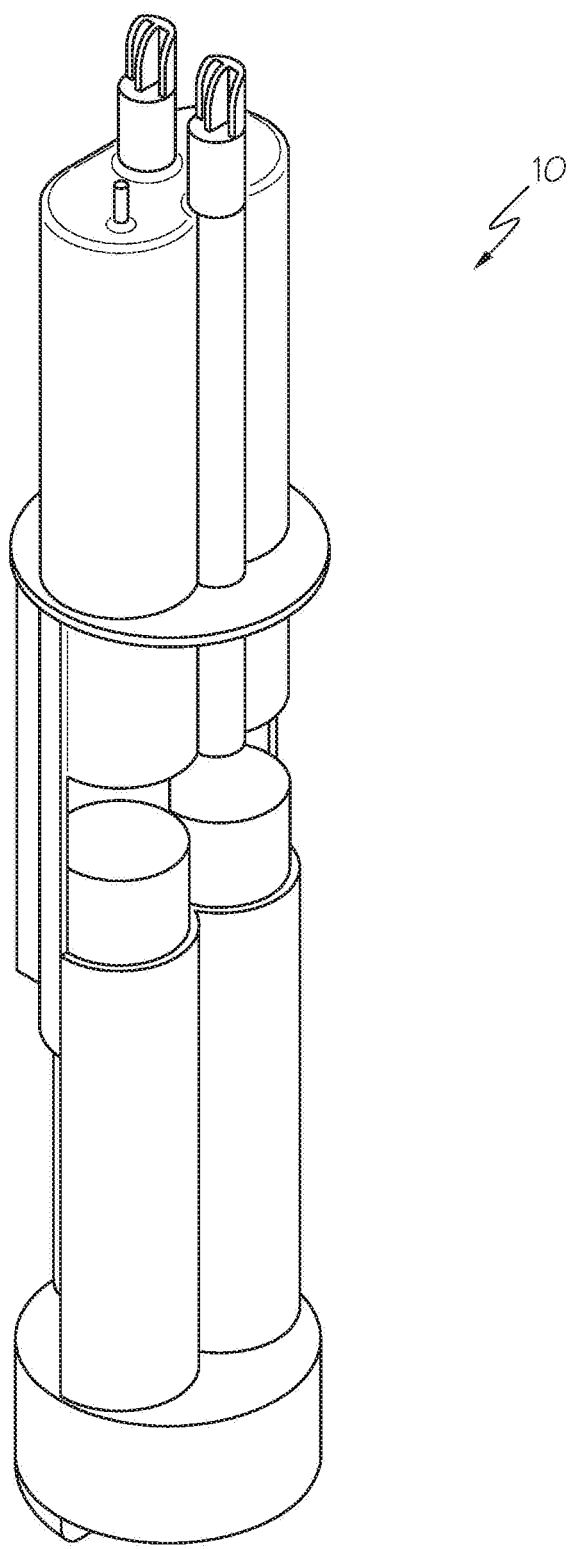
FIG. 2 is a perspective view from the back, top and left side of the inventive water filter.

Referring now to FIG. 2, a perspective view showing the top, back and left sides of the water filter is shown.

Figure 3:
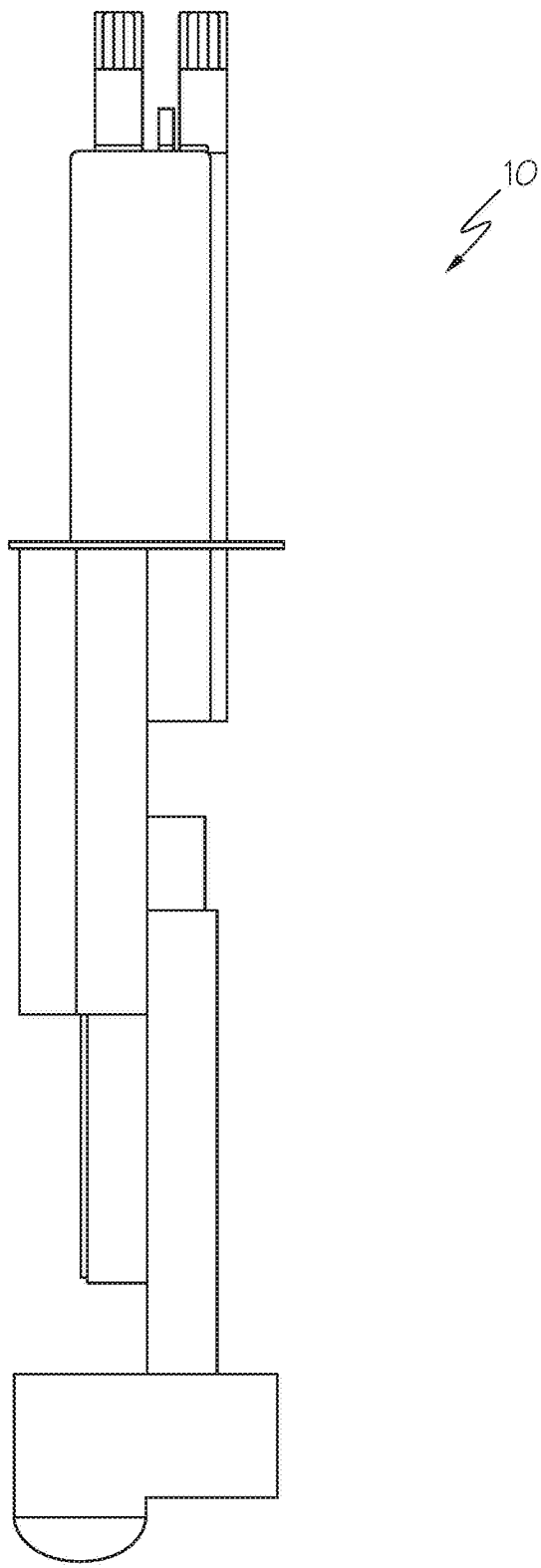
FIG. 3 is a right side view of the inventive water filter.

Referring now to FIG. 3, a right side view of the water filter is shown.

Figure 4:
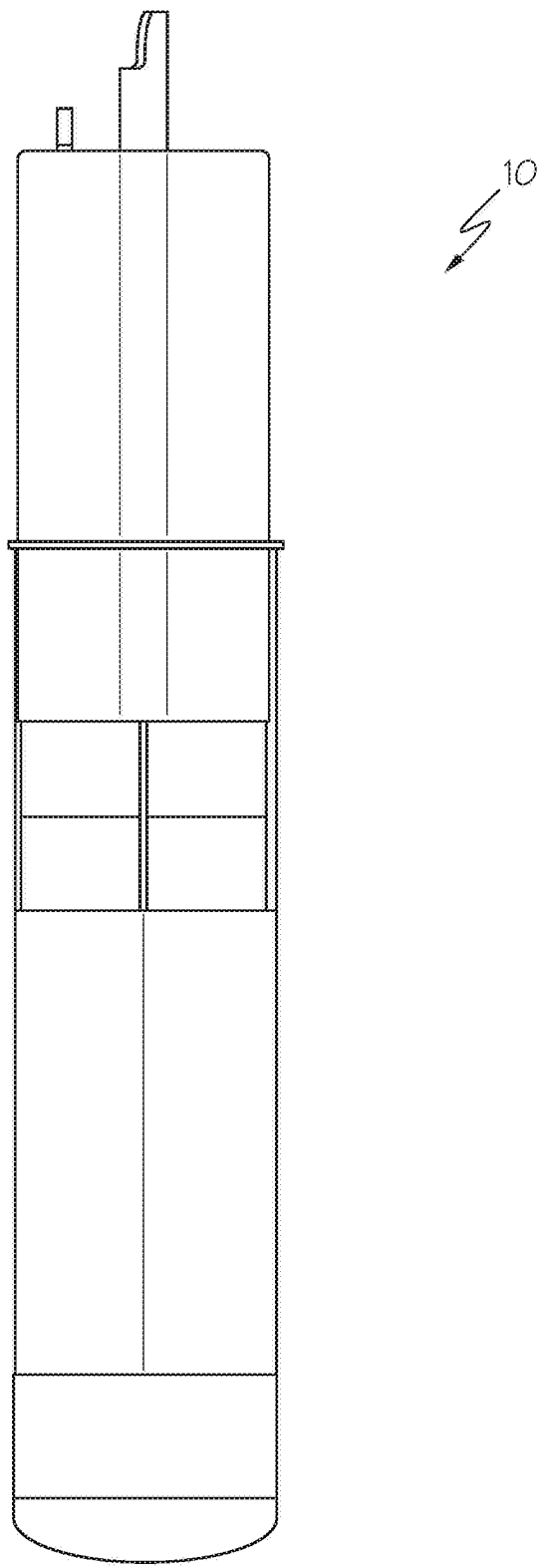
FIG. 4 is a back side view of the inventive water filter.

Referring now to FIG. 4, a back view of the water filter is shown.

Figure 5:
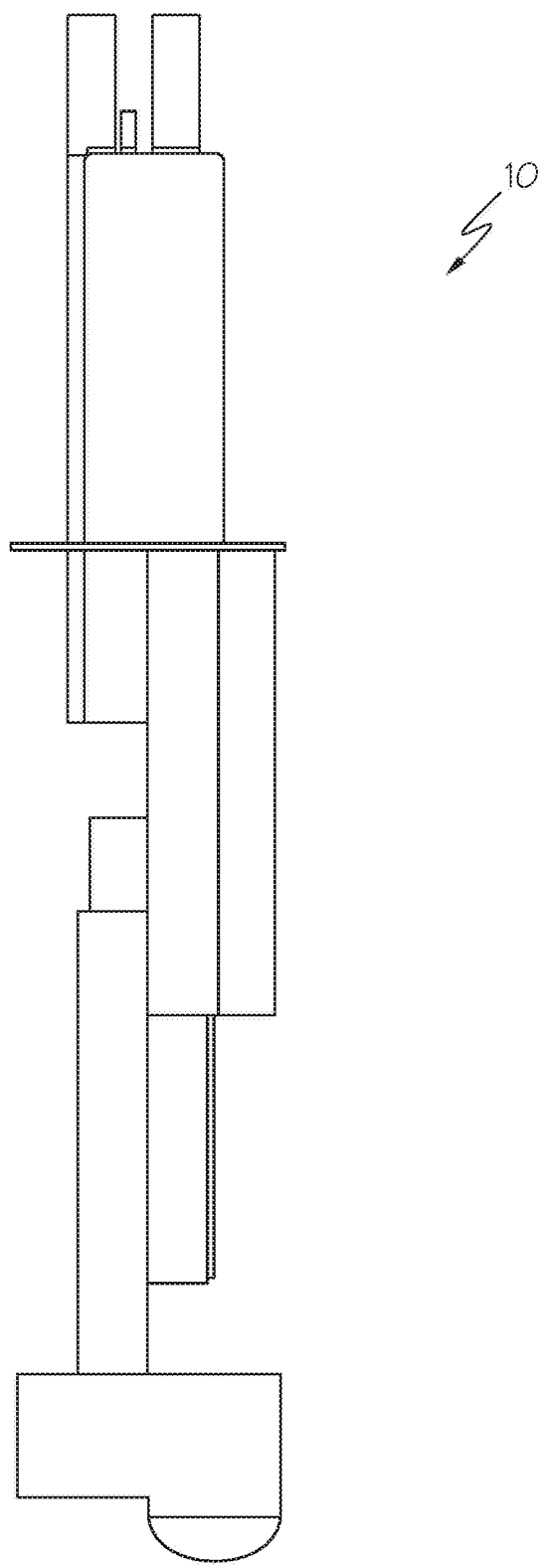
FIG. 5 is a left side view of the inventive water filter.

Referring now to FIG. 5, a left view of the water filter is shown.

Figure 6:
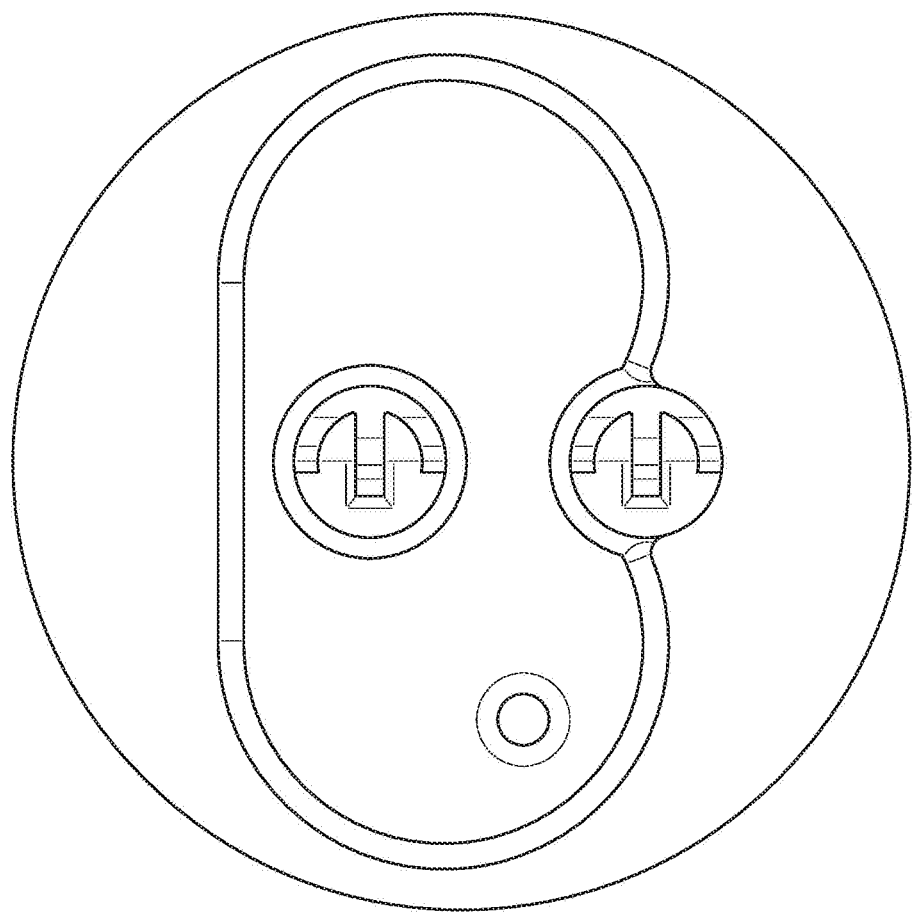
FIG. 6 is a top side view of the inventive water filter.

Referring now to FIG. 6, a top view of the water filter is shown.

Figure 7:
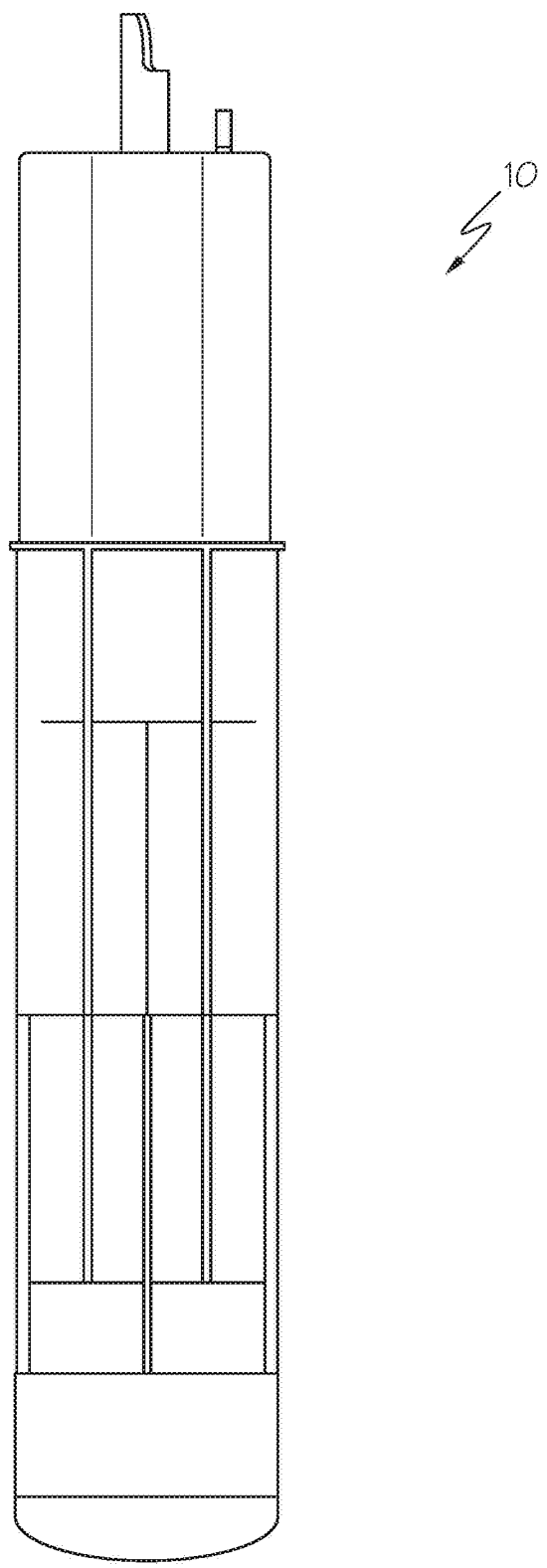
FIG. 7 is a back side view of the inventive water filter.

Referring now to FIG. 7, a back side view of the water filter is shown.

Figure 8:
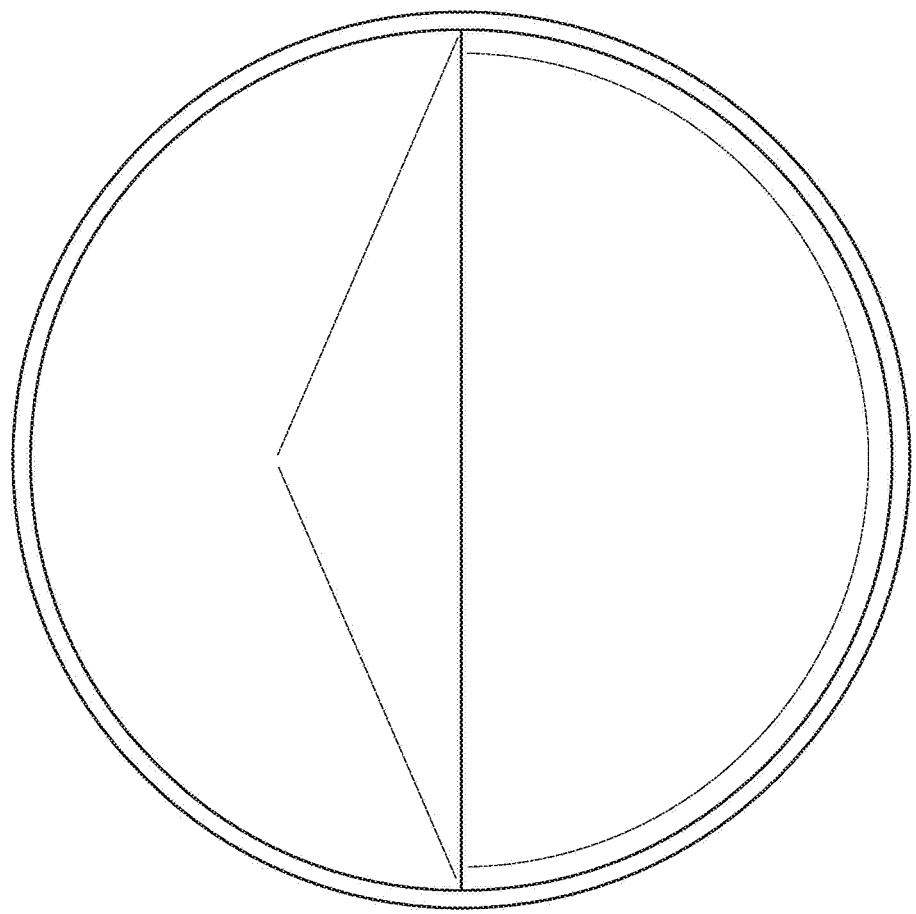
FIG. 8 is a bottom view of the inventive water filter.

Referring now to FIG. 8, a bottom view of the water filter is shown.

Figure 9:
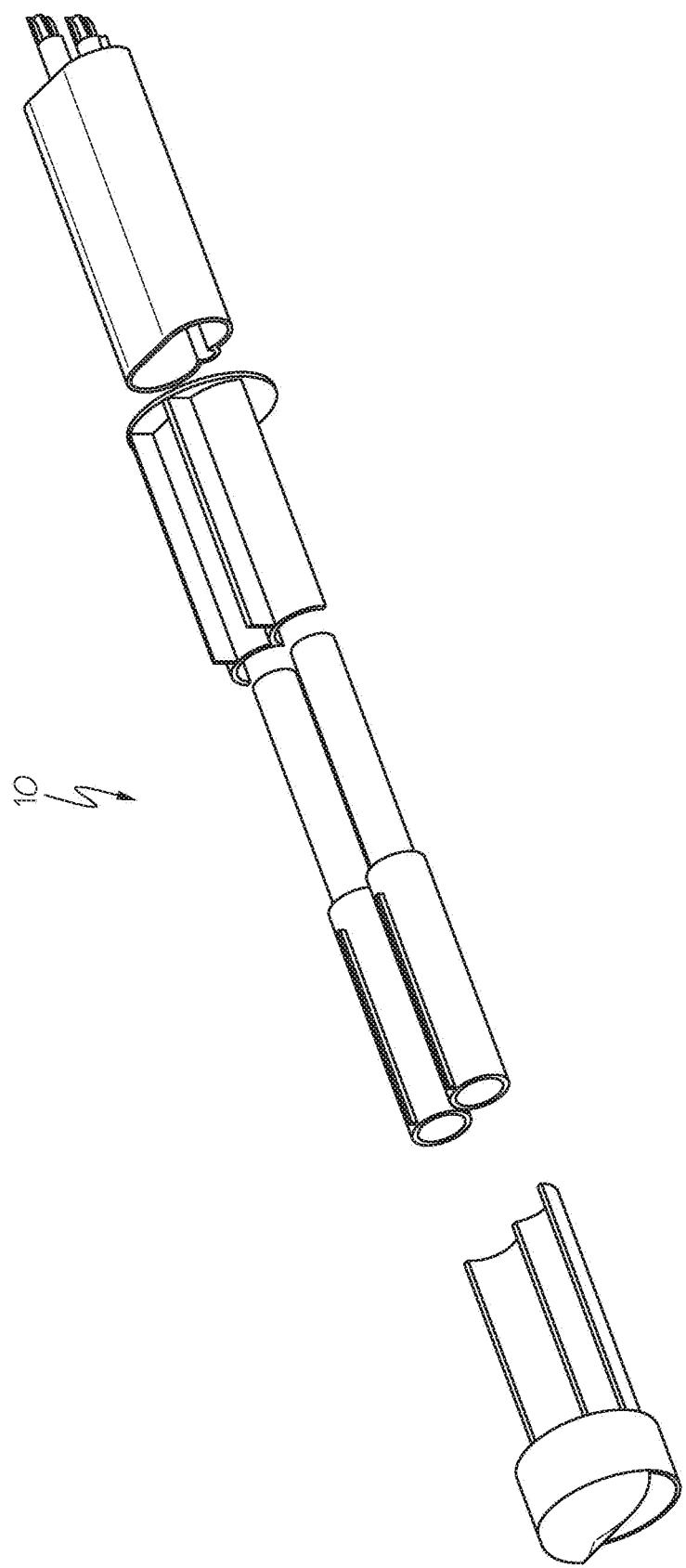
FIG. 9 is an exploded view of the inventive water filter.

Referring now to FIG. 9, an exploded view of the water filter components are shown.

Figure 10:
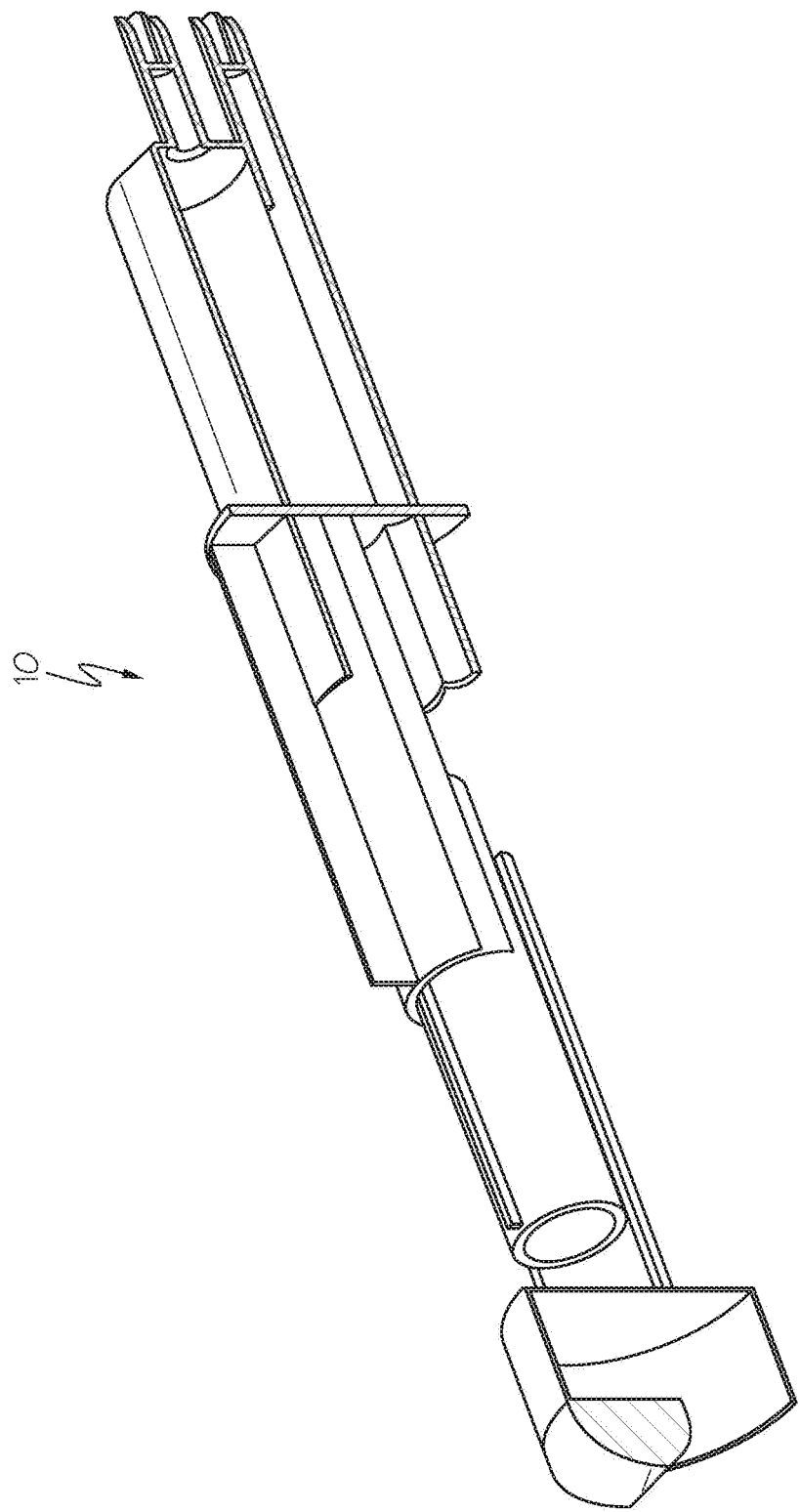
FIG. 10 is a sectional view of the inventive water filter.

Referring now to FIG. 10, a section view of the water filter is shown.

Figure 11:
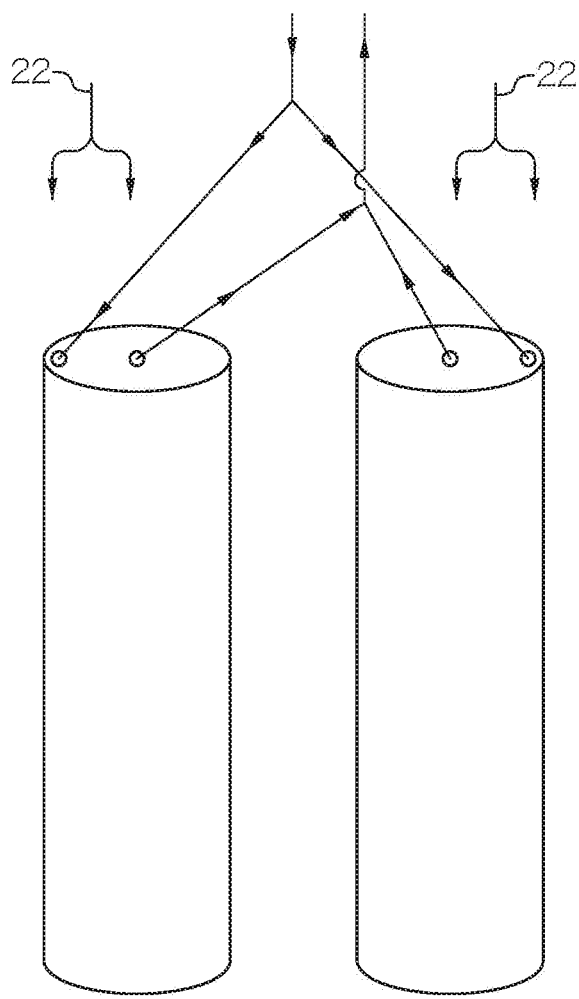
FIG. 11 is a water flow diagram showing the water flowing through the inlet, split into two streams and showing the water flowing down the outside inner portion of the carbon element and back up through the center of the element, to recombine and flow out the water outlet.

Referring now to FIG. 11, a water flow diagram is shown, in which water is shown flowing through the inlet, is split into two streams and showing the water flowing down the outside inner portion of the carbon element and back up through the center of the element, to recombine and flow out the water outlet. The four arrow shapes 22, schematically show piercings which are made when the carbon elements are slid into place in the water filter, to permit water to flow into and out of each carbon element.

Figure 12:
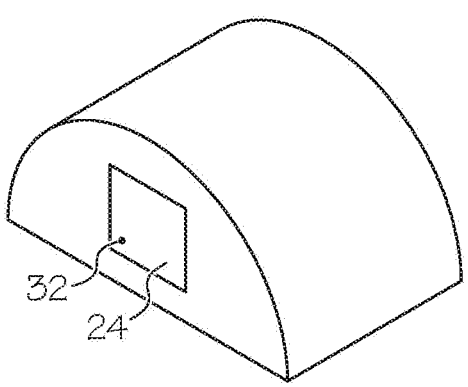
FIG. 12 shows an alternative embodiment water filter with a timer and indicator carried by the end cap.
Figure 13:
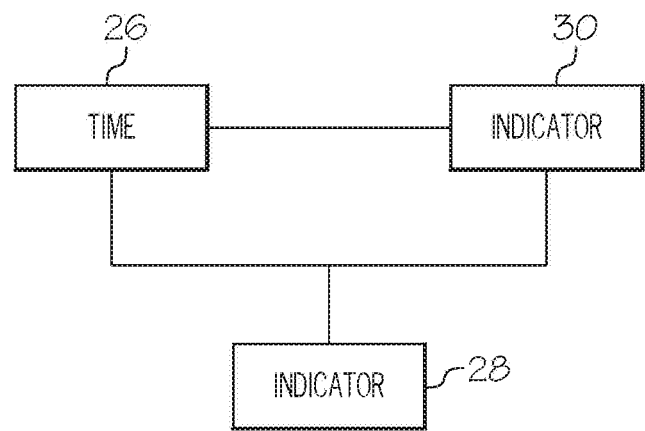
FIG. 13 shows a schematic block diagram showing the timer, indicator and battery power source.

Referring now to FIG. 12, the end cap is shown with a timer component shown at 24. FIG. 13 shows that the timer component consists of a timer circuit 26 for measuring either the elapsed time, which can be any predetermined interval, such as 3 months or 6 months, a power source 28 such as a lithium camera battery and an indicator 30 for indicating when the predetermined time interval has elapsed. A reset button in shown at 32 in FIG. 12 to reset the timer circuit.

The indicator can be an LED light, which can be configures to shine on the floor in front of the refrigerator, or it can be configured to blink. The indicator can also be a Bluetooth transmitter which can transmit a message to a paired smartphone or even automatically reorder carbon elements via a product such as an amazon echo. In addition, the indicator could be a WIFI transmitter which can perform the same functions as described with the Bluetooth option.

Figure 14:
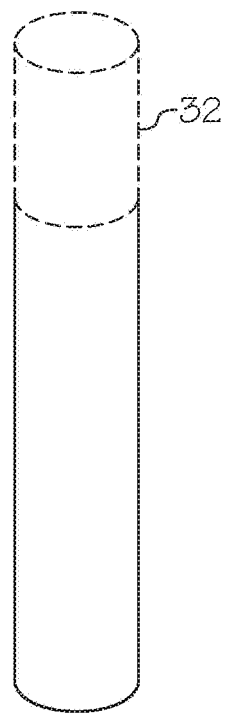
FIG. 14 shows that the carbon element can also include a section 32 which can hold either a volume measuring device, a water additive or both.

Referring now to FIG. 14, the carbon element can also include a section 32 which can hold either a volume measuring device, a water additive or both. The water volume measuring device could be electrically connected to the timer circuit 26 so the indicator 30 can be triggered by a predetermined volume of water passing through the water filter, rather than using elapsed time. The water additive could add flavors to the water as it is filtered, or vitamins, nutraceuticals and/or electrolytes, or any combination thereof.

The above disclosure is intended to be illustrative and not exhaustive. This description will suggest many variations and alternatives to one of ordinary skill in this field of art. All these alternatives and variations are intended to be included within the scope of the claims where the term "comprising" means "including, but not limited to." Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A water filter comprising:
   a housing having a water inlet and a water outlet on a first end, and
   a pair of replaceable carbon elements contained within the housing, each carbon element having a water inlet near an outside diameter and a water outlet near a center, both the water outlet and water inlet of the pair of replaceable carbon elements being on a first end of each carbon element and each of the carbon element inlets being in fluid communication with the housing water inlet and each of the carbon element outlets being in fluid communication with the housing water outlet.

2. The water filter of claim 1 wherein the replaceable carbon elements are contained in a tray which slides into and out of the housing for ease of replacement.

3. The water filter of claim 2 wherein the carbon element further includes an additive section for holding and adding an additive to water which passes through the water filter.

4. The water filter of claim 3 wherein the additive is selected from a group consisting of vitamins, flavors, nutraceuticals and electrolytes.

5. The water filter of claim 1 further including a replacement timer carried by a second end of the housing.

6. The water filter of claim 5 wherein the replacement timer contains a timer circuit powered by a battery for measuring a predetermined period of time, and further includes an indicator to indicate when the predetermined period of time has elapsed.

7. The water filter of claim 6 wherein the indicator is selected from a group consisting of an LED light, a Bluetooth transmitter and a WIFI transmitter.

8. The water filter of claim 7 wherein the timer includes a reset button to reset the predetermined period of time.

9. The water filter of claim 5 further wherein the replacement timer measures a predetermined volume of water passing through the timer, and further includes an indicator to indicate when the predetermined period of time has elapsed.

10. The water filter of claim 9 wherein the indicator is selected from a group consisting of an LED light, a Bluetooth transmitter and a WIFI transmitter.

11. The water filter of claim 10 wherein the timer includes a reset button to reset the predetermined volume of water.

* * * * *